Dec. 20, 1966   D. D. ROSHON, JR., ET AL   3,293,652
SELECTIVE PIERCING OF SHEET MATERIAL
Filed Feb. 20, 1964   2 Sheets-Sheet 2

United States Patent Office 3,293,652
Patented Dec. 20, 1966

---

3,293,652
SELECTIVE PIERCING OF SHEET MATERIAL
David D. Roshon, Jr., Binghamton, and Thomas Young, Apalachin, N.Y., assignors to International Business Machines Corporation, New York, N.Y., a corporation of New York
Filed Feb. 20, 1964, Ser. No. 346,215
4 Claims. (Cl. 346—76)

The invention relates to piercing and machining of materials by means of a high energy electromagnetic beam and, more specifically, to the selective piercing and machining of materials by means of a high energy beam; for example, a laser beam.

In general, it is well known that energy beams have been employed for piercing and machining of materials. These operations, however, have been performed by high powered continuous energy beams which necessitate the use of either a mechanical shutter or electrical control apparatus to effect selective machining or piercing.

Accordingly, it is an object of the present invention to enable selective piercing and machining operations to be performed by means of a laser beam of relatively low power which obviates the need of special mechanical shutters or control apparatus.

A specific object resides in the unique manner in which a black body is employed in combination with the material to bring about selective machining or piercing thereof by a laser beam of relatively low power.

A more specific object resides in the provision of a novel piercing apparatus for piercing records at a high rate of speed and with relative economy.

Another specific object resides in the application of information, representing patterns of coatings, to selected areas of a document or other sheet material whereby selective piercing of these selected areas may be achieved at high speeds by means of a laser beam under control of said patterns.

The foregoing and other objects, features and advantages of the invention will be apparent from the following more particular description of preferred embodiments of the invention as illustrated in the accompanying drawings.

Figure 1:
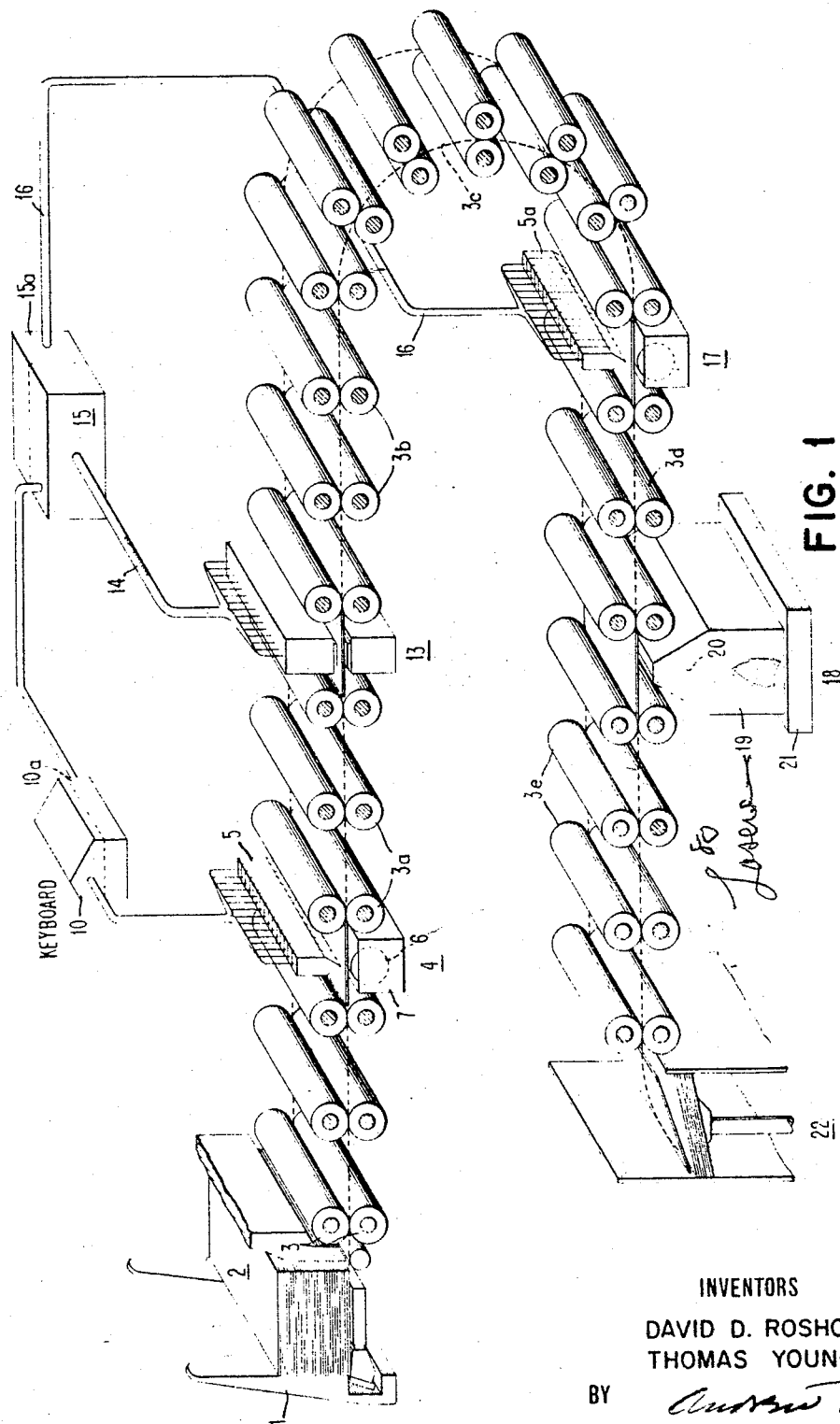
FIG. 1 shows a schematic arrangement for selective piercing of documents; for example, the familiar IBM card.

In general, it is well known that, when a laser beam of sufficient power and intensity is directed upon a sheet of paper, metal or a non-conducting substrate, material is removed by burning or evaporation. The rate at which this action occurs depends mainly upon the energy absorption rate of the material and the amount of energy in the incident laser beam. Present methods for removing materials employ a brute force laser beam of such power and intensity that, when directed upon the material, immediate removal of the material is carried out. To provide selectivity in the operation, it is necessary to introduce mechanical shutters or other electrical control apparatus to turn the beam off.

In the present invention, the energy of a selected ruby laser beam is of relatively low energy; for example, 1 to 1.5 joules, and at an energy threshold value at or below which no visible damage results to the surface which is influenced by the beam, but above which value material would be removed. However, the presence of a black body; for example, of 3 to 5 mils diameter, upon the remote surface of the material which is directly opposite the surface area (also termed the near surface), upon which the laser beam, of approximately 3 to 5 mils diameter, is incident will cause burning or evaporation of the material in the discrete area impinged by the incident beam to thus form a hole.

Although the precise mechanism for the above action is not fully understood, it can be theorized that in the case where the printed spot is on the near surface of the document, the incident laser energy is transformed from one wave length to another wave length of greater destructive power. However, since this energy is not confined, the greater portion of this energy is immediately dissipated into the surrounding atmosphere above the printed spot with a smaller portion being transmitted through the spot and into the document wherein it is dissipated without causing any apparent damage.

In the case where the printed spot is on the remote surface, the transformed energy derived from the incident laser beam confines itself initially between opposing surfaces of the spot and the document and develops into a rapid buildup of destructive power to the point where destruction and vaporization of the surrounding document above the spot takes place at a much greater rate than the rate of vaporization and destruction of the spot below the document. In summary, piercing of the document is prevented in the case of the near spot by virtue of unconfined power being rapidly dissipated into the surrounding atmosphere, whereas in the latter case where the spot is on the remote surface, piercing is accomplished by the destructive action of the beam by virtue of its initial confinement.

The selective piercing of conventional punch card documents has been successfully demonstrated by directing a coherent laser beam having an energy level of below three joules against the front surface of the card and effecting piercing only through those regions which were coated on the reverse side with ink spots having a relatively high factor of absorption.

Figure 2:
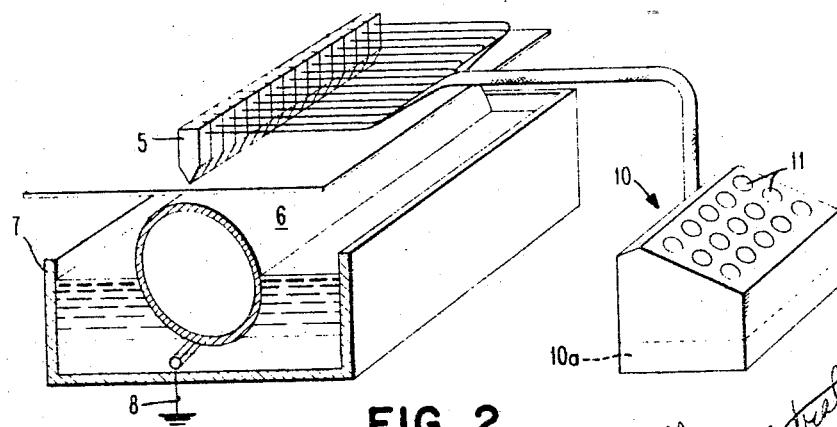
FIG. 2 shows an apparatus for applying black body material upon the surface of a document substrate.
Figure 4:
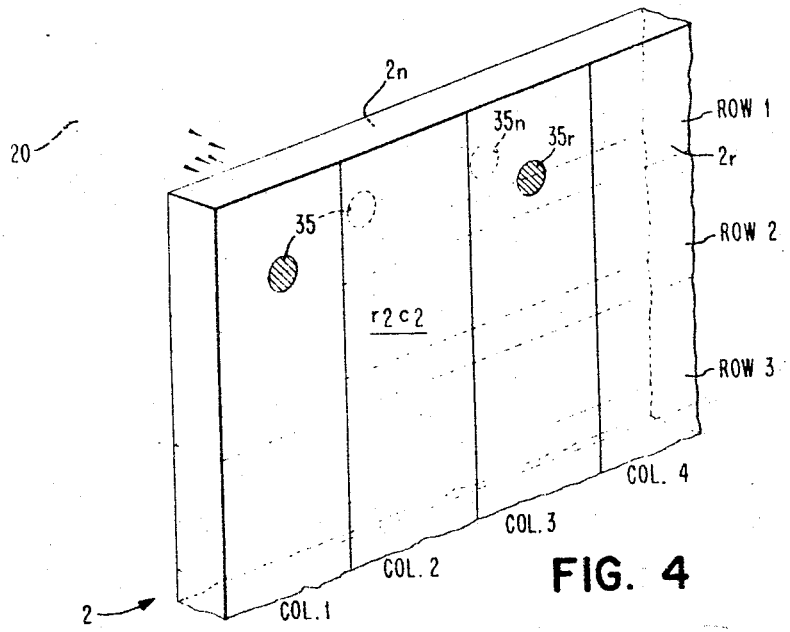
FIG. 4 shows columnar portions of a document with different coded spot configurations.

The present invention is incorporated in a document piercing machine shown in FIG. 1. This machine comprises a document feed 1 from which unpierced record documents 2, a detail of which is further shown in FIG. 4, are transported by way of feed rolls 3 to a printing station 4 whereat discrete ink spots of high energy absorption are selectively applied to discrete areas of the bottom surfaces of the documents destined for piercing. The detailed apparatus for applying the ink spots is shown in FIG. 2 and comprises a row of electrodes 5 supported by suitable means, not shown, above the path of the document. Below the document and in proximity thereto is disposed a rotating ink drum 6 immersed in a tank 7 containing ink. The drum 6 is electrically grounded by way of a connecting line 8. A control keyboard 10 having keys 11, is employed for selectively energizing the electrodes 5 with high voltage, approximately 3000 volts. An electrode, so selected and influenced by the high voltage, causes the ink to be transferred from the drum surface to the document undersurface in a discrete area opposite the selected electrode. The printing operation is performed while the document is in motion. Alternatively, other designs may be employed wherein the document may be intermittently advanced so that printing may be effected while the document is at rest.

Following the printing station 4, the documents are advanced by feed rolls 3a to an error sensing station 13 connected to comparing means 15 for determining whether the spots applied at the printing station 4 are either acceptable or not acceptable as to quality and veracity. Any means, well known in the art, may be employed to make this determination. For example, the keyed pattern of information may be stored in a storage means 10a forming part of the keyboard and compared, in the comparing device 15, with printed patterns sensed at the sensing station 13. Errors determined in this manner are stored in storage means 15a. Following the error sensing station 13, the documents are conveyed by way of rollers 3b and through a transport path 3c which overturns the documents as the latter are fed into an error correction station 17, similar in all respects to the printing station 4. At the station 17 the near surface of the document, which is opposite the remote surface bearing the printed spots, is presented for spot printing to a row of electrodes 5a, similar to those employed in the printing station 4. Errors which have been sensed at the station 13 and stored in the storage means 15a are communicated by way of line 16 to the error correction station 17 to control the actuation of the electrodes 5a for spot printing on the near surface of each document fed into the error correction station 17. For each such error sensed, a corresponding spot will be printed on the near surface of the document.

From the error correction station 17, the documents are conveyed by means of rollers 3d to a piercing station 18 comprised of 80 injection lasers 19 controlled by a power supply 21. Each laser 19 is disposed to direct an individual laser beam 20 against the columnar surfaces of the moving documents. Alternatively, the system may employ a single laser source in combination with a deflection system whereby a single laser beam may be selectively directed against the columnar surfaces of documents.

In accordance with the different coded pattern of spots shown in FIG. 4, the selective piercing operations are controlled as follows. The presence of a printed spot 35 in column 1 on the remote surface $2r$ causes the impinging laser beam 20 to pierce a hole through the document 2. Where a back-to-back combination of spots $35n$–$35r$, as in column 3, is presented to the laser beam 20, no piercing results since the energy of the laser beam is absorbed by the spot $35n$ on the near surface $2n$ impinged by the beam. Where the beam 20 impinges an area on which no spot is present either on the near or the remote side, as in column 4, no piercing takes place. Nor will piercing take place where a spot 35 appears, as in column 2, on only the near surface $2n$ directly impinged by the beam.

Following the piercing station, the documents are conveyed by means of rollers 3e to a stacker station 22.

Figure 3:
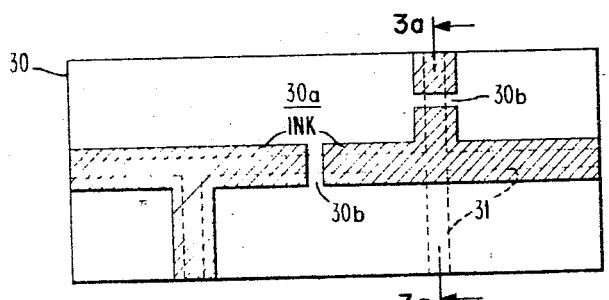
FIG. 3 shows an arrangement for selectively machining discrete portions of a metal film deposited upon a substrate.
Figure 3A:
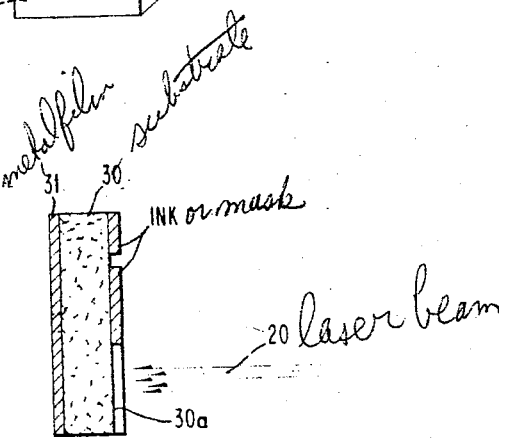

Another embodiment of the invention involves the selective machining of metal films of the kind that are used in printed circuits. As seen in FIGS. 3 and 3a, the supporting substrate is identified by the reference character 30 on one side of which, as indicated in broken lines, is a configured metal film 31. When it is desired to remove a selected portion of the metal film, ink, having a high degree of energy absorption, is applied preferably through a mask, on the near surface 30a, which is remote from the surface bearing the metal film 31, and on the areas where it is desired to inhibit the machining action of the laser beam. In certain operations it may be more expeditious to apply the laser beam to a substrate upon which a configured mask has been secured rather than applying the ink as described above. Upon exposure of the near surface 30a to the laser beam, the metal film on the remote surface will be removed, only in those regions, for example, 30b, where the beam passes through the substrate.

The detailed document portion shown in FIG. 4 may consist of a sheet of material; for example, paper, metal, ceramic, or other materials, which can be volatized, burned or destroyed by means of a high energy beam, a laser beam for example.

The front and rear surfaces thereof are respectively designated $2n$ and $2r$. Each surface is divided into rows and columns which form discrete areas at the intersection. The columns and rows respectively of one surface are coincident with corresponding columns and rows on the other surface so that a discrete area on one side formed by a given row and column will be coincident with a discrete area on the other side of the document formed by a corresponding row and column. These discrete areas can thus be identified as belonging to a given row and column, for example, $r_2$–$c_2$. Each such area is adapted to be covered by a black body having a high factor of energy absorption. The black body may be applied in any desired configuration, for example, a dot, circle, square, rectangle, etc., and these may be applied in any desired code pattern. A particular code pattern employed in connection with the present invention employs four different combinations whereby selective piercing of the document may be achieved. The four different combinations are as follows:

(1) The presence of a spot on a front discrete area and the absence of a spot on the corresponding discrete area on the back.

(2) The reverse combination of (1).

(3) The absence of spots in corresponding discrete areas.

(4) The presence of a spot on corresponding discrete areas.

Under some conditions, it may be desirable to encode the documents by means other than the embodiment shown in FIG. 1. In such cases, a modified version of the present embodiment would employ essentially a piercing station, a document feed, a document stacker, and the necessary instrumentalities for transporting the records through the machine.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The combination comprising:
an information storing document in the form of sheet material of relatively low energy absorption characteristics and having front and back surfaces, each divided into rows and columns whose intersections form discrete areas, each such area adapted to receive a discrete coating of material which has relatively high energy absorption characteristics, the rows and columns on the first side being coincident with the corresponding rows and columns on the back surface so that the discrete areas on the front side are coincident with corresponding discrete areas on the back side, said discrete areas bearing selected front and back patterns of said coatings to indicate presence or absence of information, first and second coating stations, means for transporting each document past said coating stations for presentation of a different surface to each of said stations, and controllable means at each of said stations for selectively applying coatings to discrete areas on said surfaces.

2. A piercing apparatus for piercing sheet material having relatively low energy absorption characteristics, said sheets bearing front and back patterns of coating material of relatively high energy absorption characteristics, said patterns having coded combinations for representing the presence or absence of information; and
means for directing across the front of the sheet a laser beam of such intensity that piercing results only in those areas on which appear a back pattern representing the presence of information.

3. A document coating apparatus comprising:
a document feeding station for feeding documents,
a document transport path connected to said feeding station, a printing station connected to said transport path for applying a pattern of coatings to one surface of each of said documents, an error sensing station connected to said transport path for detecting errors in the information patterns applied at the printing station, storage means connected to said error sensing station for storing manifestations of errors, and an error correcting station connected to said transport path for applying to the opposite surface of each of the documents in error a correcting pattern of coatings under control of the stored manifestations of errors.

4. A document piercing apparatus comprising:

a document feeding station for feeding documents, a document transport path connected to said feeding station, a printing station connected to said transport path for applying a pattern of coatings to one surface of each of said documents, an error sensing station connected to said transport path for detecting errors in the information patterns applied at the printing station, storage means connected to said error sensing station for storing manifestations of errors, an error correction station connected to said transport path for applying to the opposite surface of each of the documents in error a correcting pattern of coatings under control of the stored manifestations of error, and a piercing station having a laser beam directed to impinge upon said opposite surface, the power of the beam being of such intensity that piercing will be effected only in those areas bearing only the information representing patterns and not in the areas bearing the corrected patterns.

References Cited by the Examiner

UNITED STATES PATENTS

| | | | |
|---|---|---|---|
| 1,573,174 | 2/1926 | Lasker | 118—10 |
| 2,084,848 | 6/1937 | Lasker | 235—61.12 |
| 2,143,376 | 1/1939 | Hansell | 346—49 |
| 2,858,073 | 10/1958 | Taube | 235—61.12 |
| 2,922,688 | 1/1960 | Boyan | 346—76 |
| 3,045,905 | 7/1962 | Tarasuk | 235—61.12 |
| 3,074,809 | 1/1963 | Owen | 250—65 X |
| 3,134,892 | 5/1964 | Opitz et al. | 219—69 |
| 3,163,489 | 12/1964 | Borne et al. | 346—76 |
| 3,172,989 | 3/1965 | Nelson | 219—69 X |
| 3,181,170 | 4/1965 | Akin | 346—76 X |
| 3,183,518 | 5/1965 | Henry et al. | 346—76 |

RICHARD B. WILKINSON, *Primary Examiner.*

LEO SMILOW, *Examiner.*

J. W. HARTARY, *Assistant Examiner.*